United States Patent Office 3,082,091
Patented Mar. 19, 1963

3,082,091
EFFERVESCING COMPOSITION IN PARTICLE FORM
Pierre F. Smith, 460 Cristiani St., Roselle, N.J., and Louis D. King, 67 Lincoln Ave., Newark, N.J.
No Drawing. Filed July 3, 1956, Ser. No. 595,799
2 Claims. (Cl. 99—78)

Our invention is designed to produce an effervescing composition in particle form. It provides a stable particle form composition which is a suitable base for various potable and medicinal effervescing solutions, and which, in a particular aspect, provides an effervescing composition for use as a soft drink concentrate.

The production of stable compositions in dry powdered or tabletted form for providing effervescing solutions has been a commercial problem for a long time in both the pharmaceutical and soft drink arts.

Bicarbonate of soda is the most readily available source of carbonation but when it is handled in dry finely divided form, particularly in consumer sized products, its tendency to instability creates many handling, formulating and packaging problems. It is sufficiently unstable thermally that in the higher ranges of ambient temperatures encountered seasonally and in storage, it decomposes at too rapid a rate for satisfactory commercial handling. When combined in finely divided form in effervescing compositions with the common fruit acids, citric or tartaric, its tendency to moisture pick-up results in accelerated decomposition as a result of the double decomposition reaction occurring in the aqueous environment. The tendency to instability can be controlled somewhat by tabletting, particularly if desiccants or anhydrous fillers are used. Although this expedient is feasible in some applications, it is totally infeasible in the preparation of dry solid form effervescing compositions for soft drink use where quick and clear solution is essential, product bulk must be minimized and the presence of sweetening and flavoring agents aggravates the stability problem.

In our experimentation in this field, we have discovered that stable effervescing compositions can be readily produced in particle form by coating the bicarbonate with a thin film of a protective gum. We have found, for example, that a slurry of bicarbonate can be formed in mucilage comprising vegetable gum or a gelatin, and after the mixture is dried, a gum coated bicarbonate in particle form results which has remarkable stability with respect to thermal decomposition or to decomposition because of moisture or moisture vapor attack. We have further found that the gum coated bicarbonate has special value in the production of solid form effervescing compositions. As a group, the vegetable gums of the hemi-cellulose type appear to have special advantages. For example, we have found that guar gum lends itself with particular advantage to coating finely divided solids such as bicarbonate of soda. It provides outstanding protection against moisture vapor attack as well as stabilization against thermal decomposition. Moreover, the guar-coated product disperses readily in water so that clear solutions result.

Our invention, therefore, provides a particle form base composition useful for producing effervescing solutions. The new compositions comprise a gum coated bicarbonate and an acidic agent in solid form which is capable of releasing carbon dioxide by reaction with the bicarbonate upon dissolution in water. The preferred acids are the common fruit acids, citric and tartaric acids, or water soluble salts thereof. The gums useful for coating the bicarbonate include vegetable gums such as guar, locust bean, acacia, psyllium and the like. Of these, guar is preferred. Cellulose derivatives such as methylcellulose, carboxymethylcellulose, hydroxyethylcellulose, etc., also have value. In addition, gelatins including bone gelatin and pork skin gelatin can be used. It has been found however, that the carbohydrate type gums, particularly the hemi-celluloses, which are essentially non-ionic, have special value in the production of effervescing compositions for internal consumption. Thus, the vegetable gums such as psyllium, locust bean and guar, for example, are particularly suited, and of these guar is outstanding.

The use of the gum protected bicarbonate has special advantages in the preparation of effervescing compositions used for making soft drinks. As noted above, there are particular problems in formulating products of sufficient stability to permit marketing on a scale reaching mass markets, while providing a drink which has sufficient convenience in preparation, eye and taste appeal to be competitive with bottled soft drinks. We have found that the combination of the gum coated bicarbonate, particularly when a vegetable gum of the hemi-cellulose is used as the coating, with citric or tartaric acid can be formulated with a sweetening agent such as "Sucaryl" and/or saccharin and the usual powdered flavors and dyes to produce effervescing soft drinks of excellent properties.

The compositions of the invention are produced by forming a mucilage of the protective gum by dispersing it in water. The concentration of the mucilage will depend upon properties of the gum, but ordinarily about 1 to 10 percent of the gum in water is suitable. Care should be taken to insure that complete hydration of the gum takes place and the mucilage may be heated for this purpose. The bicarbonate is mixed with the mucilage, and the mixture is agitated to form a homogeneous slurry. The proportions may vary over a considerable range, for example, from about 10–50 parts of mucilage to about 90–50 parts of bicarbonate. A proportion of 25 parts of mucilage to 100 parts of bicarbonate has been found specially suitable with guar gum. The slurry is dried sufficiently to permit screening the mass through a fine mesh screen. The drying process then may be completed, preferably while avoiding a temperature exceeding about 95° F., since at higher temperatures the decomposition of bicarbonate to carbonate begins to accelerate. Hence, by computation from the above-indicated ranges of proportions, the range by weight percent based on the mucilage-bicarbonate mixture extends from a minimum of about 0.1 to a maximum of about 5.0 of the gum, with a proportion of about 2.0 weight percent (based on the maximum mucilage concentration of 10 percent of the gum in water) indicated as specially suitable. After drying, the latter amounts to approximately 2.4 percent by weight of the total gum-coated bicarbonate. The dried and coated particles are then mixed in the desired proportions with the other ingredients of the composition. In preparing medicinal preparations, it may be desirable to have either an excess of bicarbonate or an excess of the fruit acid, depending upon whether an alkaline or acid solution is desired. For preparation of a soft drink effervescing composition, however, it is important to have a ratio of citric acid to bicarbonate providing a pH in aqueous solution in the range of about 3 to 4.5. A proportion of sweetener, advantageously, an alkali or alkaline earth metal cyclamate, e.g. sodium of calcium cyclamate, is added to give the desired degree of sweetness. For example, about 5 to 25% by weight of sodium cyclamate based on the total composition may be used. The sweetness and taste properties in solution may be enhanced if desired by adding about 1 to 25 parts of saccharin to the cyclamate. Also, a small amount of a glutamate may be added to enhance sweetness, e.g. about 1 mg. of sodium glutamate per gram of cyclamate.

In formulating the new compositions, it is advantageous to use powder-form flavors. Particularly valuable are the so-called "sealed in flavors" comprising minute droplets of the liquid flavoring material or oil enclosed by an inert film of a water-soluble substance such as a vegetable gum, e.g. acacia, or a synthetic material of similar chemical and physical properties. Commercially available products are typified by the Sealva brand of flavors produced by van Amerigen-Haebler, Inc. of Elizabeth, New Jersey, or the Flav-O-Lok brand of flavors produced by Polak's Frutal Works, Inc. of Middletown, New York. Typical levels of flavor per 5 to 10 gram dose of beverage powder are 0.100 gram of Sealva Lemon (V3373), or 0.100 gram, of Flav-O-Lok Cola.

It is usually advantageous to include one or more soluble dyes in the composition to improve the color of the finished drinks. Buffering agents to stabilize pH at the desired level may be used. The mono- and disodium citrates, for example, have value. Also, a small amount of sodium benzoate may be added as a preservative and moisture repellent. Tricalcium phosphate in small quantities may be used to prevent the citric acid from caking during mixing and storage. It may be advantageous to add a small amount of a compatible potable nonionic detergent such as polyoxyethylene sorbitan monoleate or other polyglycol esters of fatty acids. The detergent is added in small concentrations of about 1% by weight and provides clarity and sparkle to the soft drink product. The use of sorbitol (from equal proportions to 2 or 3 parts to 1) in combination with the sucaryl enhances the flavor of the finished drink. The sorbitol appears to supply "body," making the drink less watery to the taste. It also helps to mask the taste of saline by-products and promotes the sweetening effect of cyclanate.

The invention will be further illustrated by examples of suitable formulation. In the experiments a mucilage of the gum was first prepared and treated so as to insure complete hydration. Sodium bicarbonate then was placed in a mixing vessel and mucilage was added in increments, with thorough mixing. The mixture was partially dried by applying a current of warm air while continuing agitation until the material started to "ball." The mass then was forced through a 20-mesh wire screen and was placed in a constant temperature, circulating air oven to complete the drying. The drying temperature was maintained at 95° F. maximum temperature, and the average drying time in the oven was 3 hours.

A series of runs were made with the following gums:
Gelatin, U.S.P.—10% mucilage
Pharmagel A (pork skin gelatin having an isoelectric point about pH 8 and exhibiting maximum solubility in acid solution)—10% mucilage
Pharmagel B (bone gelatin exhibiting maximum solubility in alkaline solution)—10% mucilage
Methylcellulose (Methocel-Dow) 100 cps. grade—5% mucilage
Guar gum (Jaguar A20A and Jaguar A20D-Hall)—1% mucilage.

In these experiments, it was found that the guar coated samples gave less foaming, less floating of solids on top of the foam and less foam stabilization than those coated with the other gums. The gelatins appeared somewhat less desirable from the standpoint of foam stabilization and showed a relatively slow rate of hydration. The methylcellulose also tended to stabilize the foam to a greater extent and hydrated less rapidly than guar. Also, the celluloses were found to be somewhat less readily compatible with other ingredients for use in aqueous solution. The guar coated bicarbonates were outstanding in properties, and analysis showed that there was substantially no conversion of sodium bicarbonate to sodium carbonate during the coating process. After drying, the coated product was found by analysis to contain less moisture than the original bicarbonate.

In another series of experiments, the above procedure was followed using samples of guar mucilage both freshly prepared without heating and after heating in a water bath for ½ hour to insure complete hydration. The mucilage concentration was 1%. It was found that the heated mucilage was superior in producing better dispersion of the gum. Although the heating process increased the viscosity of the mucilage, this did not appear to be disadvantageous.

In other experiments, the ratio of mucilage to bicarbonate was varied from 1:3 to 1:5, and a ratio of about 1:3 was found to be most favorable. Also, the drying time was increased from one hour to 4 hours at 90° F., and then to 1½ hours at 105° F., with only negligible conversion of bicarbonate to carbonate.

The following formulations illustrate soft drink, effervescing compositions prepared with coated bicarbonate as described above.

*Example 1*

This example illustrates the preparation of a lime-lemon effervescent powder. First, the sodium bicarbonate was coated and colored according to the following formula:

Sodium bicarbonate, U.S.P._____grams__ 250.0
Guar mucilage (1%, Jaguar A20A)_____cc__ 83.3
   Containing—
      F.D. & C. Yellow 5_____grams__ 0.260
      F.D. & C. Blue 1_____do____ 0.017

The resulting stabilized and colored bicarbonate was then mixed thoroughly with the remaining ingredients, after all had been reduced to 30-mesh particle size, in the following proportions:

Grams
Sodium bicarbonate (coated and colored)_____ 241.1
Citric acid, anhydrous_____ 418.9
Lime-lemon flavor (Sealva)_____ 15.0
Sodium cyclamate_____ 68.4
Tricalcium phosphate, U.F._____ 1.1

*Example 2*

This example illustrates a formula using a mixture of sodium cyclamate and saccharin.

Parts
Sodium bicarbonate (coated and colored)_____ 409.8
Citric acid (anhydrous, fine gram)_____ 837.8
Calcium phosphate (tribasic)_____ 2.2
Lime flavor powder (Polak Flav-O-Lok)_____ 4.68
Lemon flavor powder (Polak Flav-O-Lok)_____ 4.68
Sodium cyclamate_____ 77.6
Saccharin sodium_____ 7.76

In the above example, the bicarbonate was prepared by slurrying 500 parts of U.S.P. sodium bicarbonate with 133.32 parts of a 1.25% mucilage of guar gum (Jaguar A20A), 0.52 part of F.D. & C. Yellow #5 dye and 0.034 part of F.D. & C. Blue #1 dye, and thereafter drying and granulating.

*Example 3*

This example illustrates the preparation of a root beer effervescing composition.

First, sodium bicarbonate was coated and colored as described above using the following materials:

Parts
Sodium bicarbonate, U.S.P._____ 250.0
Guar mucilage (1% A20A)_____ 83.3
   Containing—
      F.D. & C. Red #4_____ 1.040
      F.D. & C. Red #2_____ 0.520
      F.D. & C. Yellow #5_____ 2.080
      F.D. & C. Blue #1_____ 0.135

The resulting bicarbonate was mixed thoroughly with the remaining ingredients, after reduction of all particles to 30-mesh size, to obtain the following composition:

| | Parts |
|---|---|
| Sodium bicarbonate (coated and colored) | 244.4 |
| Citric acid, anhydrous | 418.9 |
| Tricalcium phosphate, N.F. | 1.1 |
| Root beer flavor (Sealva) | 20.0 |
| Sodium cyclamate | 68.4 |

About 7.0 cc. (7.2 grams), which is equivalent to one rounded teaspoonful of the above formulation prepares one drink of 8-fluid ounces.

In the above examples it was found that the ingredients should be divided so that the particles are all finer than 30-mesh to provide rapid solution. On the other hand, it was found preferable to have the particles coarser than 60-mesh because excessive foaming tends to result if the particles are too fine, and there is a greater tendency to pick up moisture.

The gum coated bicarbonate has a wide range of applications not limited by the above examples. Where ordinarily bicarbonate is thermally unstable and resists tabletting so that it is difficult to stabilize by mechanical means the gum coated preparations show excellent storage stability. For example, the stability of the powdered products as prepared in the examples was checked by storage for nine weeks in containers maintained at 68° F. at varying relative humidity. The product was stable and unspoiled at relative humidities up to 52%. After 12 weeks in an open beaker in an air-conditioned office at 77° F., no evidence of deterioration could be detected.

The product is free flowing and lends itself to packing by automatic machinery. Advantageously, the packing conditions should be maintained below about 50% relative humidity and 77° F.

A particular advantage of the gum coated bicarbonate compositions is that they may be mixed with materials such as vitamin C (ascorbic acid) which are normally inactivated by alkalies. Thus, our invention provides a means for providing a variety of vitamin fortified soft drink compositions.

We claim:

1. A dry free-flowing powdered composition of matter suitable for producing effervescing solutions in water which is characterized by enhanced stability against premature decomposition in the dry state and which essentially comprises a mild acidic agent of the group consisting of citric and tartaric acid in finely divided form and a water soluble bicarbonate wherein said bicarbonate essentially consists of finely divided particles of the bicarbonate coated with a non-toxic, chemically inert, water dispersible gum and in which the gum is guar in a proportion of from about 0.1 to about 2.4 percent of the gum based on the total weight of the gum coated particles and wherein said particles are essentially unagglomerated with other solid components of the composition.

2. A dry free-flowing powdered composition of matter suitable for producing effervescing soft drinks by solution in water which contains coloring and flavoring means which is characterized by enhanced stability against premature decomposition in the dry state which consists essentially of (1) citric acid in finely divided form, (2) a carbonating agent which essentially consists of finely divided particles of sodium bicarbonate coated with a non toxic, chemically inert, water dispersible gum and in which the gum is guar in a proportion of from about 0.1 to about 2.4 per cent of the gum based on the total weight of the gum-coated bicarbonate particles and wherein said particles are essentially unagglomerated with other solid components, and wherein the proportions of (1) and (2) provide a pH in water solution of about 3 to about 4.5, and (3) about 5 to 25 percent by weight of a cyclamate sweetening agent.

References Cited in the file of this patent

UNITED STATES PATENTS

| 30,147 | Luedke | Sept. 25, 1860 |
| 2,312,381 | Bickenheuser | Mar. 2, 1943 |
| 2,332,735 | Lyons | Oct. 26, 1943 |
| 2,540,253 | Gakenheimer | Feb. 6, 1951 |
| 2,694,641 | Atwood et al. | Nov. 16, 1954 |
| 2,764,486 | Stevens et al. | Sept. 25, 1956 |
| 2,803,551 | Helgren | Aug. 20, 1957 |